United States Patent

Ishii

[11] Patent Number: 5,563,853
[45] Date of Patent: Oct. 8, 1996

[54] MAGNETO-OPTICAL RECORDING APPARATUS THAT COMPENSATES FOR MAGNETIC FIELDS LEAKING FROM AN OBJECTIVE LENS ACTUATOR AND A LINEAR MOTOR

[75] Inventor: Kazuyoshi Ishii, Tokyo, Japan

[73] Assignee: Canon Kabushiki Kaisha, Tokyo, Japan

[21] Appl. No.: 556,833

[22] Filed: Nov. 2, 1995

Related U.S. Application Data

[63] Continuation of Ser. No. 169,220, Dec. 20, 1993, abandoned.

[30] Foreign Application Priority Data

Dec. 21, 1992 [JP] Japan ..................... 4-355331

[51] Int. Cl.$^6$ ..................... G11B 13/04
[52] U.S. Cl. .......... 369/13; 369/44.14; 360/114
[58] Field of Search ............ 369/13, 44.11, 369/44.21, 44.31, 44.14, 110, 14, 44.39, 44.23; 360/59, 114, 103; 365/122

[56] References Cited

U.S. PATENT DOCUMENTS

| 4,939,711 | 7/1990 | Yoda ......................... 369/13 |
| 5,126,983 | 6/1992 | Ikegame et al. ............. 369/13 |
| 5,226,030 | 7/1993 | Konno ...................... 369/110 |

FOREIGN PATENT DOCUMENTS

| 0122816 | 10/1984 | European Pat. Off. . |
| 3-259444 | 11/1991 | Japan . |

OTHER PUBLICATIONS

Patent Abstracts of Japan, Kokai No. 3-295004, vol. 16, No. 136, Apr. 1992.
Patent Abstracts of Japan, Kokai No. 3-113758, vol. 15, No. 316, Aug. 1991.
Patent Abstracts of Japan, Kokai No. 4-310653, vol. 17, No. 132, Mar. 1993.
Patent Abstracts of Japan, Kokai No. 4-222903, vol. 16, No. 577, Dec. 1992.
Patent Abstracts of Japan, Kokai No. 4-67364, vol. 16, No. 266, Jun. 1992.
Patent Abstracts of Japan, Kokai No. 3-19161, vol. 15, No. 144, Apr. 1991.
Patent Abstracts of Japan, Kokai No. 4-12003, vol. 15, No. 127, Mar. 1991.
Patent Abstracts of Japan, Kokai No. 2-126403, vol. 14, No. 352, Jul. 1990.

*Primary Examiner*—Ali Neyzari
*Attorney, Agent, or Firm*—Fitzpatrick, Cella, Harper & Scinto

[57] ABSTRACT

A magneto-optical recording apparatus includes an actuator for driving an objective lens for focusing a light beam on a magneto-optical disk to effect focusing and tracking, a magnetic head for applying a magnetic field to a portion irradiated by the light beam on the magneto-optical disk, which has a substantially U-shaped core with a main pole facing the magneto-optical disk and an opposed pole opposed thereto, and a linear motor for performing a seek operation to move the objective lens and magnetic head in a radial direction with respect to the magneto-optical disk. In one embodiment, a direction of a composite field of leaking fields from the actuator and from the linear motor is substantially parallel to a diagonal line connecting between a corner of the opposed pole of the core near the magneto-optical disk and a corner located diagonal thereto. The apparatus may be so arranged in another embodiment that leaking fields from the actuator and from the linear motor cancel each other with respect to components parallel to the magneto-optical disk near the magnetic head.

18 Claims, 11 Drawing Sheets

MAGNETO-OPTICAL RECORDING APPARATUS THAT COMPENSATES FOR MAGNETIC FIELDS LEAKING FROM AN OBJECTIVE LENS ACTUATOR AND A LINEAR MOTOR

This application is a continuation of prior application Ser. No. 08/169,220 filed Dec. 20, 1993, now abandoned.

BACKGROUND OF THE INVENTION

1. Field of the Invention

The present invention relates to a magneto-optical recording apparatus operated in the magnetic modulation method.

2. Related Background Art

Figure 1:
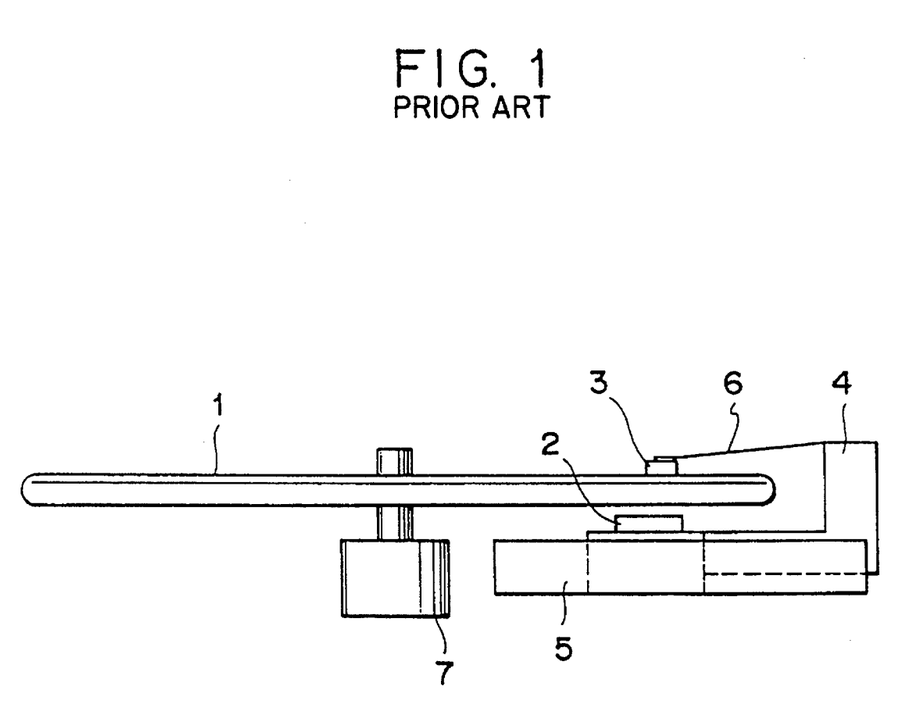
FIG. 1 is a drawing to show the schematic construction of a conventional magneto-optical recording apparatus.

There are heretofore well known magneto-optical recording apparatus which can record information signals in a magneto-optical disk by the magnetic modulation method. FIG. 1 shows the schematic construction of a conventional magneto-optical recording apparatus of such type. In FIG. 1, reference numeral 1 designates a disk, 2 an optical head, and 3 a magnetic head. The magnetic head 3 is a floating magnetic head provided with a slider, which is held above the upper surface of disk 1 by a load beam 6. Also, the magnetic head 3 is incorporated with the optical head 2 located below the lower surface of disk 1 through a connecting member 4 so that a linear motor 5 may drive to move them in the radial direction of disk 1. The disk 1 is rotated by a spindle motor 7.

Figure 2:
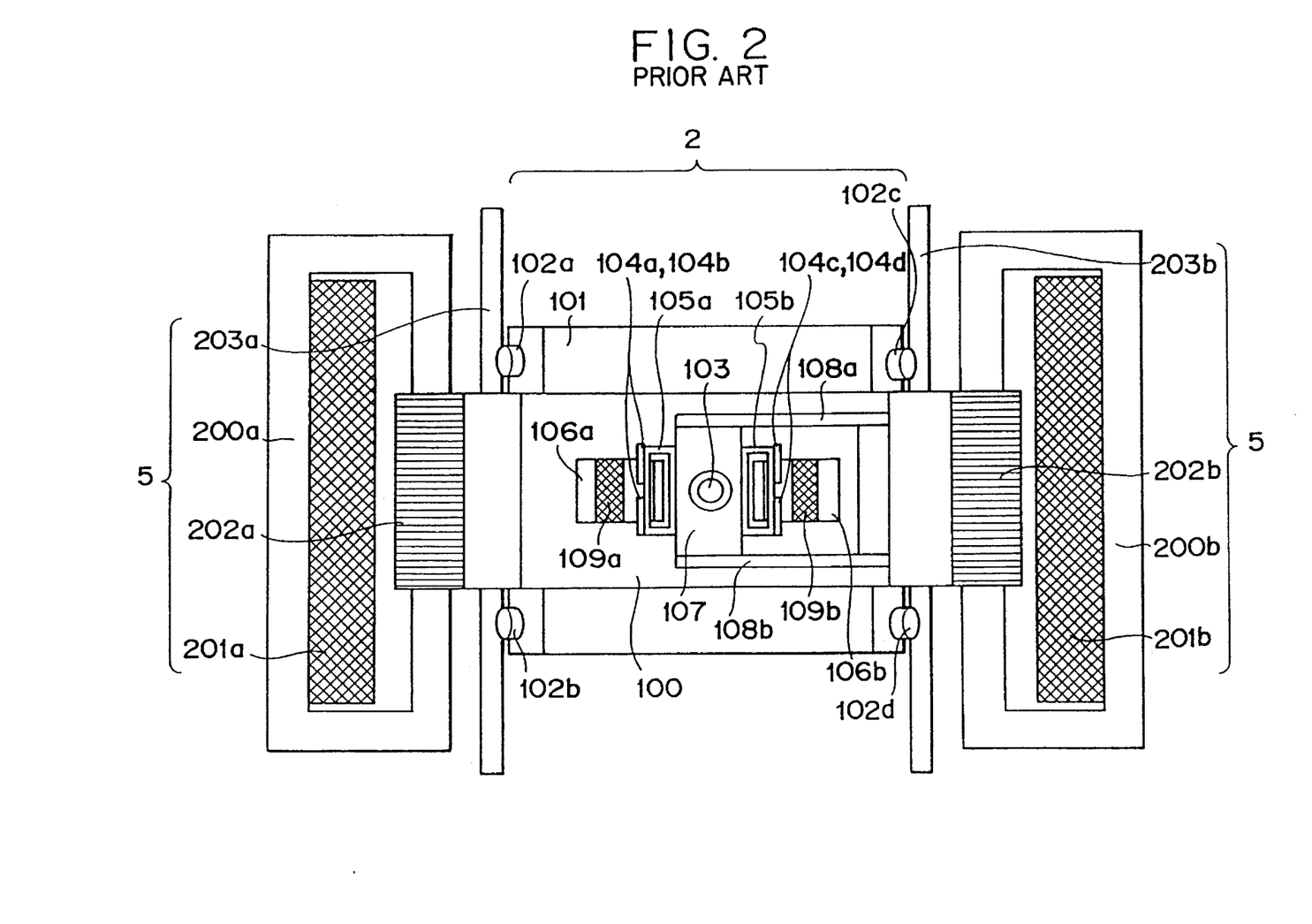
FIG. 2 is a drawing to show the detailed construction of an actuator, a linear motor and a magnetic head in the conventional apparatus.
Figure 3:
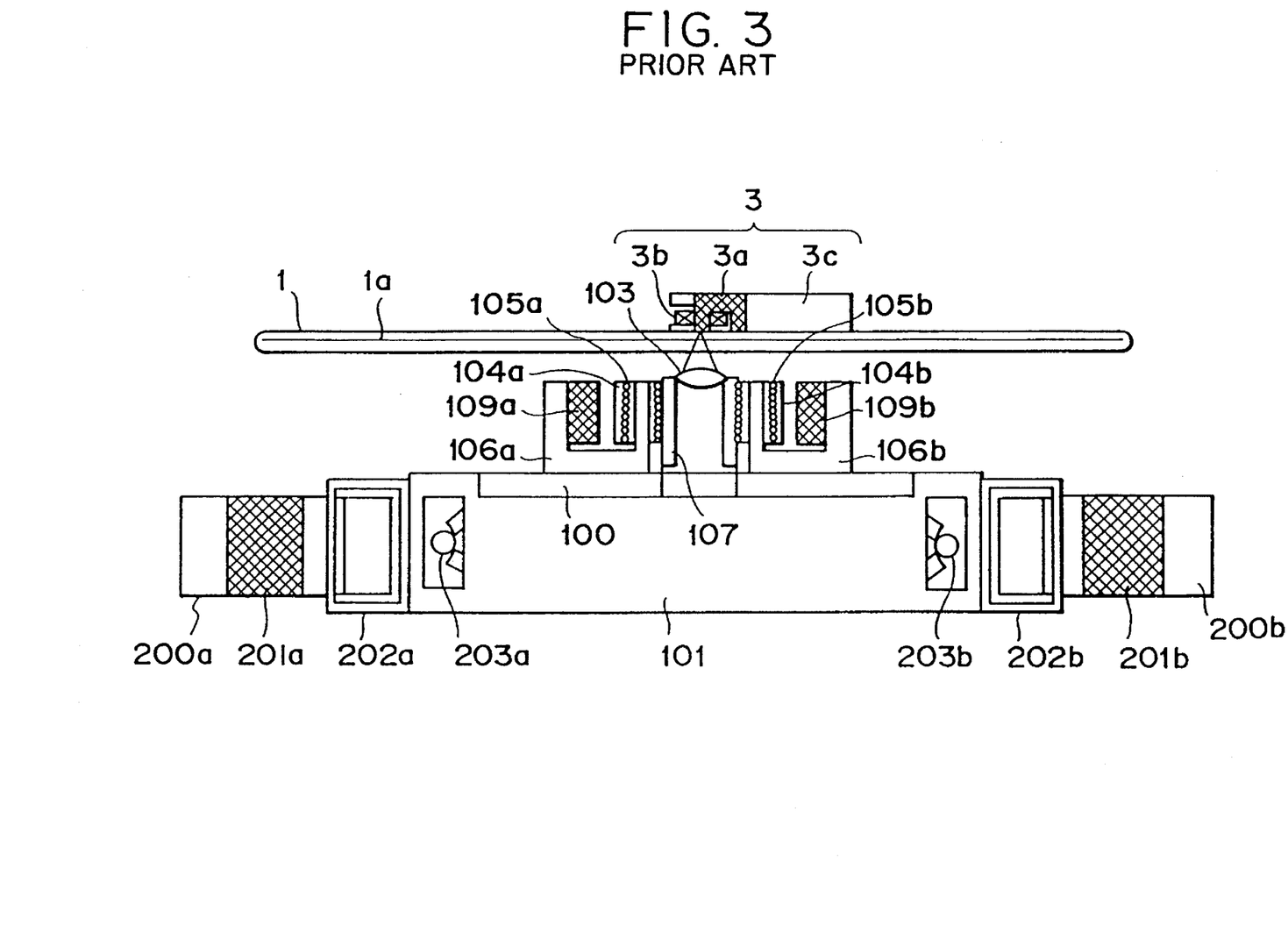
FIG. 3 is a drawing to show the detailed construction of an actuator, a linear motor and a magnetic head in the conventional apparatus.

The optical head 2, the magnetic head 3 and the linear motor 5 will discussed further detail in the following. FIG. 2 illustrates the optical head 2 and the linear motor 5 as the top plan view thereof. Also, FIG. 3 shows cross sections of the optical head 2, the magnetic head 3, the disk 1 and the linear motor 5 (along the radial direction of the disk).

The optical head 2 has an unrepresented laser source, which emits a light beam. The objective lens 103 focuses the light beam to form a fine spot on a recording layer 1a in the disk 1. Focusing coils 105 and tracking coils 104 are mounted on a lens holder 107 for holding the objective lens 103 in a supported state by plate springs 108. When a current is supplied to the tracking coils 104 and the focusing coils 105, a magnetic force acts between the coils and actuator magnets 109 or actuator yokes 106 fixed on a base 100. The magnetic force moves the objective lens to scan the beam thereby so that the fine spot may accurately trace a recording track formed on the recording layer 1a in disk 1, performing a so-called tracking operation and focusing operation. The thus arranged actuator is mounted on a carriage 101.

The linear motor 5 is constructed of linear motor yokes 200 to each of which a linear motor magnet 201 is attached, guides 203, and linear motor coils 202 attached to the carriage 101 for the actuator. When a current is supplied to the linear motor coils 202, a magnetic force acts between the coils and the linear motor magnets 201 or the linear motor yokes 200. The magnetic force moves the carriage 101 in the radial direction of disk 1 to perform the seek operation. The carriage 101 is arranged to move on the guide rails 203 through rollers 102.

The magnetic head 3 is composed of a U-shaped core 3a made of a magnetic material, a coil 3b wound around a main pole of the core 3a, and a slider 3c made of a hard material such as ceramics. In this case, the main pole and opposed pole of core 3a are arranged to face the disk.

In recording an information signal, a current modulated according to the information signal is supplied to the coil 3b in magnetic head 3, whereby a bias field modulated according to the information signal is applied from the main pole to the recording layer 1a in disk 1 in the direction normal thereto. As described above, the optical head 2 focuses the light beam to form a fine spot irradiating a region to which the bias field is applied on the recording layer 1a. The temperature increases in the portion irradiated by the light beam in the recording layer 1a to suddenly decrease the coercive force therein. Then magnetization is applied to perform recording corresponding to the direction of the applied bias field. As the disk is further rotated, the thus magnetized portion leaves the portion irradiated by the light beam, whereby the temperature again decreases. With the temperature decrease, the coercive force suddenly increases to maintain the recorded magnetization. In this manner, information is recorded in a pattern of magnetization corresponding to the information signal.

As described above, electromagnetic drive means is used in general as the actuator or the linear motor for an optical head in a magneto-optical recording apparatus. In this arrangement, magnetism could leak from magnets in the drive means, and the leaking magnetism sometimes acts near the magnetic head in recording the information signal. It was pointed out heretofore as a problem that such a leaking field had components in the direction perpendicular to the disk which was added as offset to the modulated field generated by the magnetic head and that poor signal recording could result if the recording of the information signal was carried out in the state that the field with offset was applied to the disk. A solution to this problem has already been proposed (as in Japanese Laid-open Patent Application No. 3-259444).

The inventors investigated such a problem in detail and found that influence was greater on the disk from a magnetic field caused by magnetization induced inside the core in the leaking field rather than the direct effect of the leaking field itself on the disk, for some shapes of the core.

In addition, according to the investigation by the inventor, when a core asymmetric in shape with respect to the main pole is employed, such as the substantially U-shaped core as described above, the poor signal recording is caused not only by the perpendicular components of the leaking field acting near the magnetic head to the disk but also by the magnetization induced inside the core by horizontal components.

Figure 4:
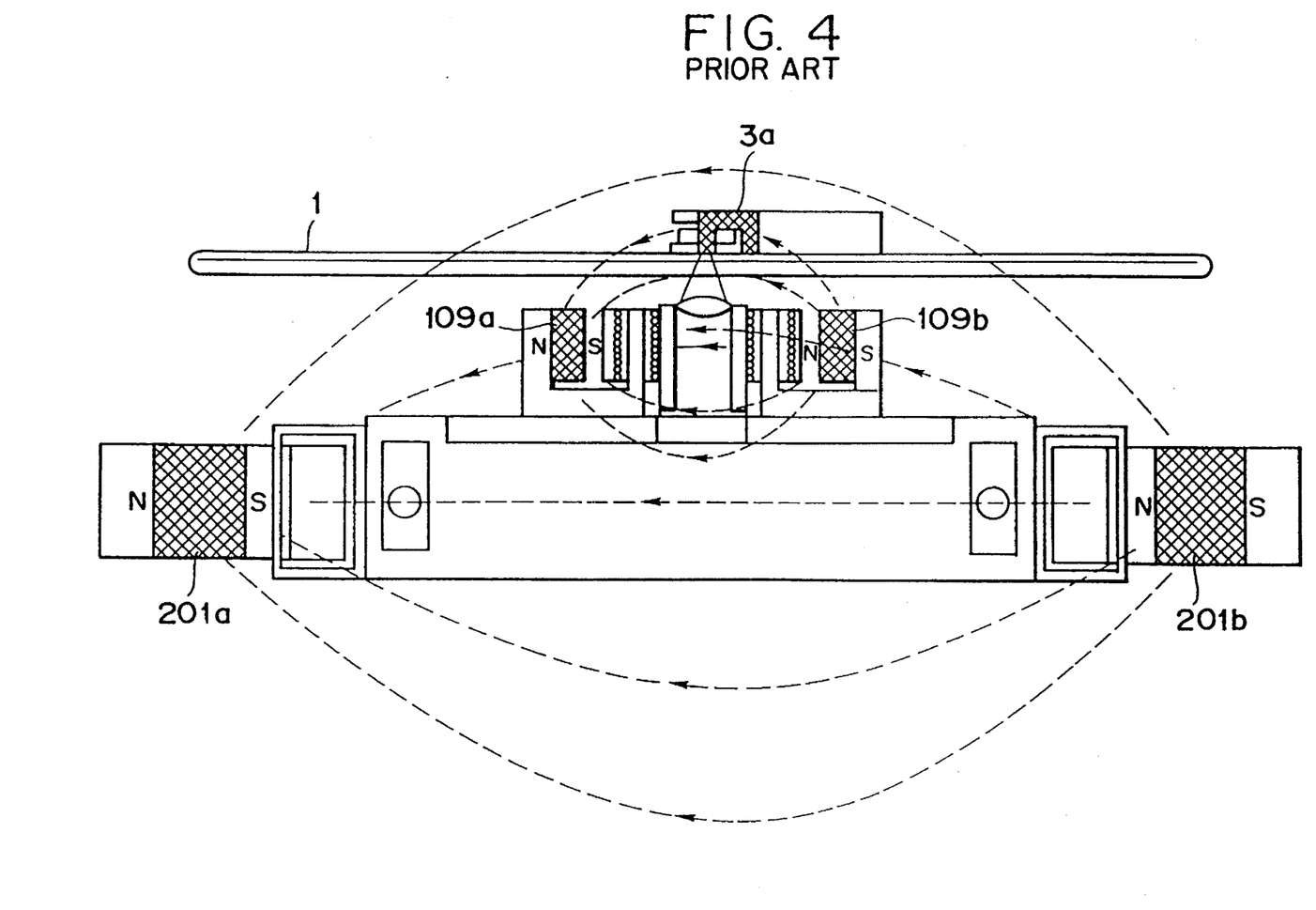
FIG. 4 is a drawing to show the scheme of leaking fields in a conventional magneto-optical recording apparatus.

This will be described referring to FIG. 4 and FIG. 5. FIG. 4 shows a case in which a pair of actuator magnets 109 and a pair of linear motor magnets 201 are arranged with opposed faces being opposite magnetic poles (i.e., such that the N-pole of right magnet 109b or 201b is opposed to the S-pole of left magnet 109a or 201a), in which broken lines represent schematic lines of magnetic force of leaking fields from the magnets.

Figure 5:
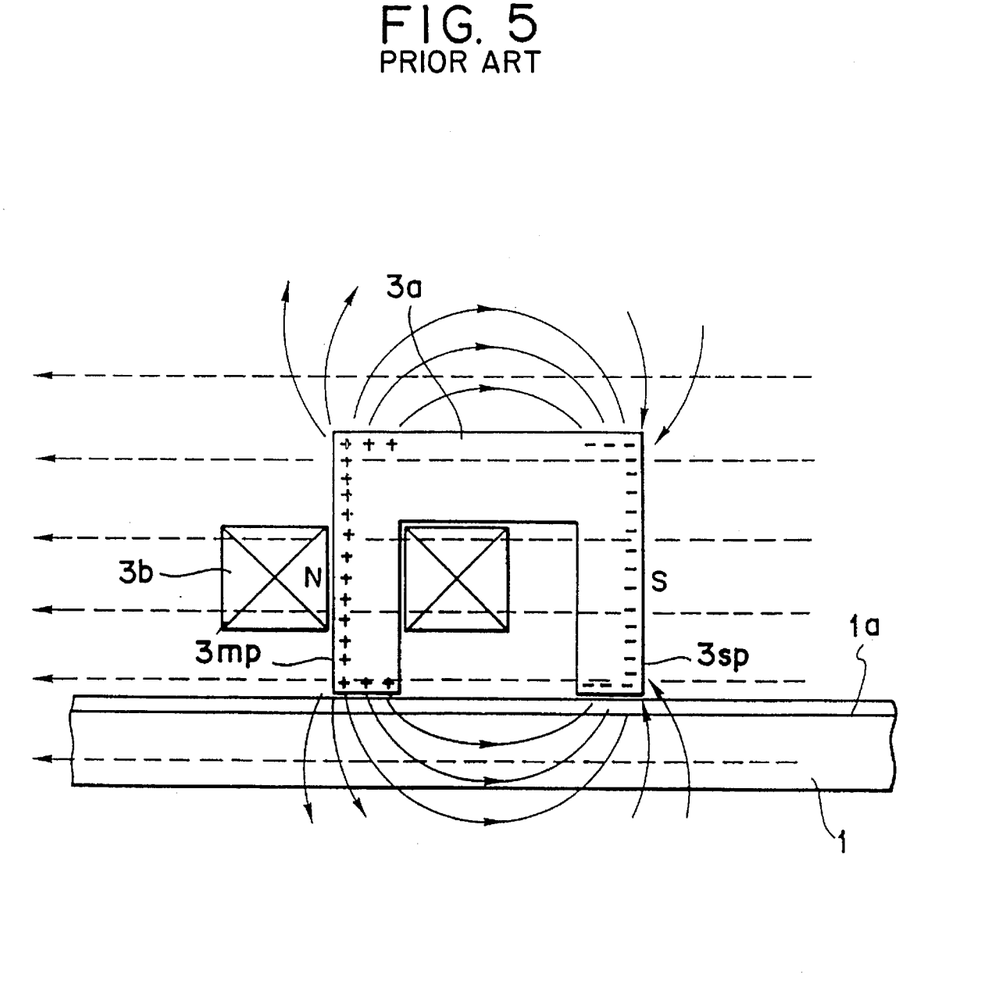
FIG. 5 is an enlarged drawing near the core in FIG. 4.

FIG. 5 is an enlarged drawing to show the state of the leaking fields near the core 3a in the magnetic head shown in FIG. 4. When the arrangement of magnets as shown is employed, the direction of leaking fields as shown by broken lines is parallel to the disk 1 in the vicinity of the core 3a but there are few perpendicular components to the disk 1. In such leaking fields, magnetization is induced inside the core 3a while being distributed on the sides of main pole 3 mp and opposed pole 3 sp as shown by signs + and − in FIG. 5. A magnetic field caused by this magnetization has lines of magnetic force as shown by solid lines in FIG. 5, which leave the ends of main pole 3 mp of core 3a and reach the ends of the opposed pole 3 sp. This magnetic field acts in the perpendicular direction to the portion irradiated by the light beam in the recording layer 1a in disk 1 immediately below the main pole 3 mp. Consequently, even if the leaking fields from the actuator magnets and from the linear motor magnets have only the parallel components but no perpendicular components relative to the disk, the magnetic field caused by the magnetization of the core acts also in the perpendicular direction relative to the disk, which is added as an offset in recording the information signal and therefore could be a cause of the poor signal recording.

The above phenomenon appears outstanding if the shape of the core is asymmetric with respect to the main pole. Actually, the shape of the core is not symmetric with respect to the main pole in most cases because of issues in production. For example, the core is usually formed approximately in a U shape, as shown, including a ring head. Therefore, such a problem is very serious.

Here, if the main pole and the opposed pole in the approximately U-shaped core are aligned in the tangential direction of the disk as in the above example, the above problem is rarely caused by a radial component on the disk (which is a component perpendicular to the plane of FIG. 4 or FIG. 5) among the parallel components to the disk in the leaking field. The above problem is mainly caused by a tangential component to the disk (which is a parallel component to the plane of FIG. 4 or FIG. 5).

SUMMARY OF THE INVENTION

The present invention has been accomplished taking the above points into consideration. According to the present invention, a magneto-optical recording apparatus comprises an actuator for electromagnetically driving an objective lens for focusing a light beam to form a fine spot on a magneto-optical disk so as to effect focusing and tracking, a magnetic head for applying a magnetic field to a portion irradiated by the light beam on the magneto-optical disk, and a linear motor for electromagnetically driving the objective lens and the magnetic head in a united or synchronized manner to effect the seek operation in the radial direction of the magneto-optical disk, in which the magnetic head is provided with a substantially U-shaped core having a main pole facing the magneto-optical disk and an opposed pole opposed to the main pole and in which a direction of a leaking field produced by the actuator and the linear motor is substantially parallel near the magnetic head relative to a diagonal line connecting between a corner of the opposed pole of the core and a corner located diagonal thereto. This arrangement can surely prevent poor information recording due to the influence of a leaking field.

In another aspect, the actuator magnets and the linear motor magnets are arranged such that leaking fields appearing from the actuator and from the linear motor have components parallel to the magneto-optical disk, which cancel each other at least in the vicinity of the magnetic head, whereby poor information recording due to the influence of a leaking field can be surely prevented.

DESCRIPTION OF THE PREFERRED EMBODIMENTS

Figure 6:
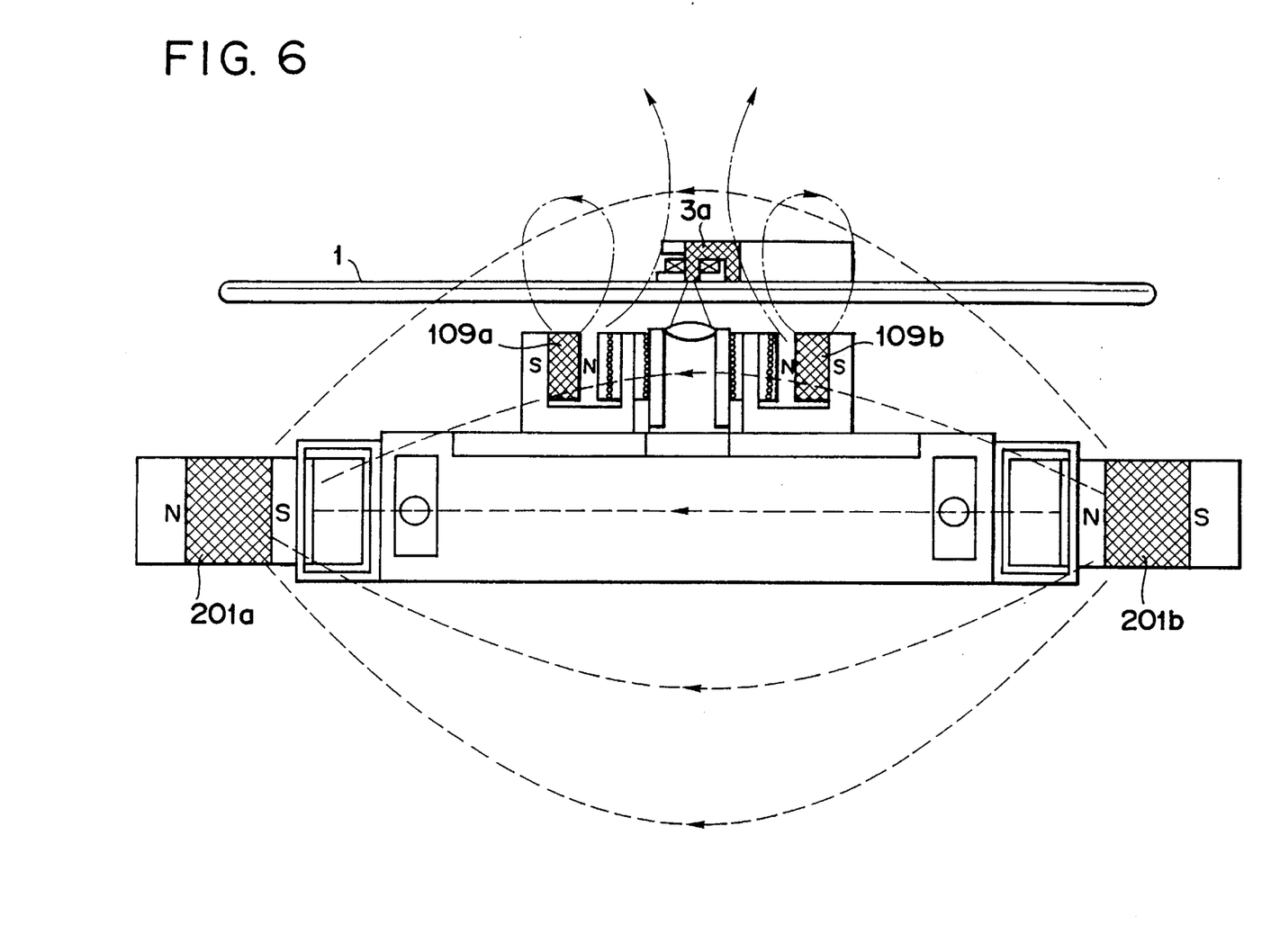
FIG. 6 is a drawing to show the scheme of leaking fields in a magneto-optical recording apparatus in an embodiment of the present invention.

The magneto-optical recording apparatus of the present invention will be described in detail with reference to embodiments as shown in FIG. 6 to FIG. 11. FIG. 6 shows an example in which a pair of actuator magnets 109 are arranged to have mutually opposed faces as the same magnetic poles (N-poles opposed to each other in the present embodiment) and a pair of linear motor magnets 201 are arranged to have mutually opposed faces as different magnetic poles (N-pole of right magnet 201b and S-pole of left magnet 201a opposed to each other in the present embodiment), in which broken lines show approximate lines of magnetic force of leaking fields.

Figure 7:
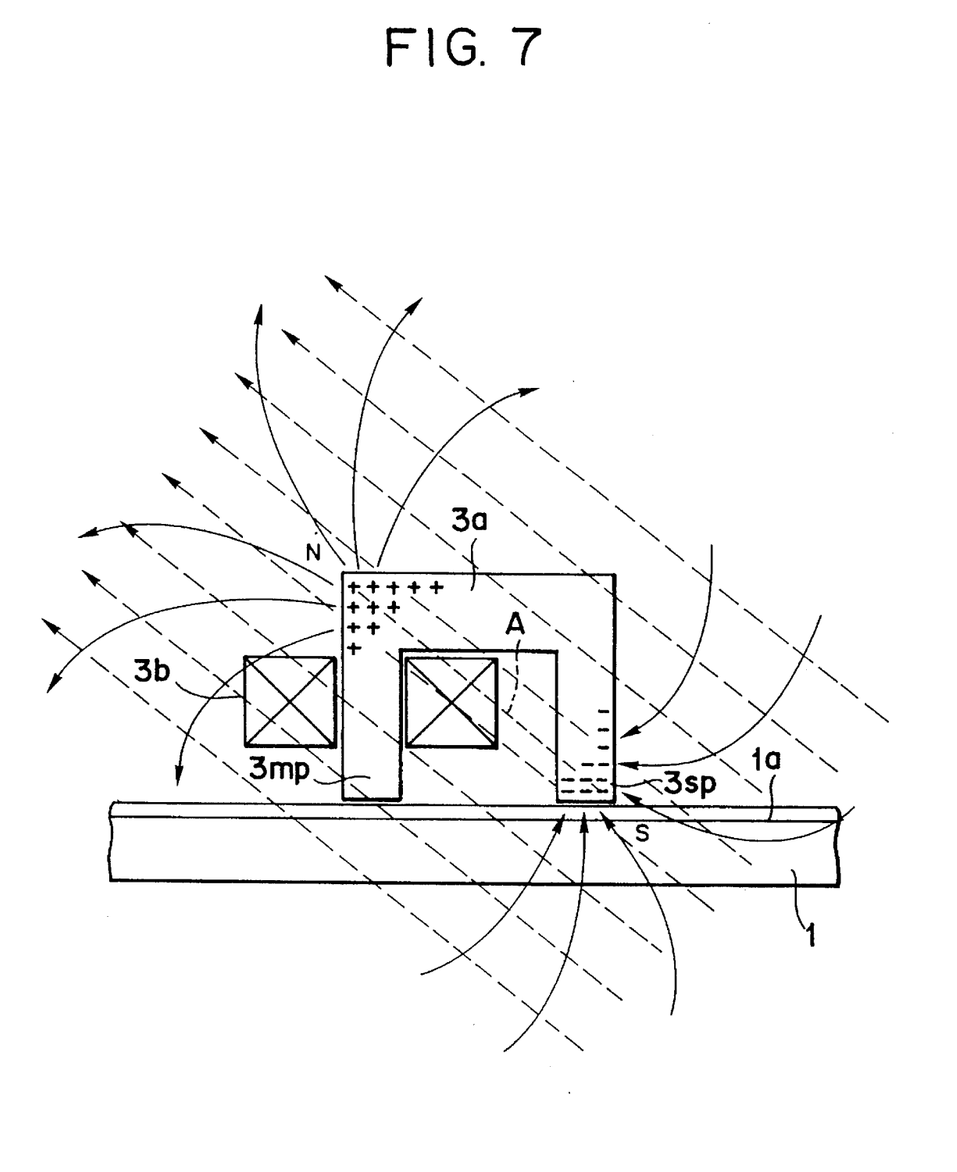
FIG. 7 is an enlarged drawing near the core in FIG. 6.

As shown in FIG. 6, a leaking field from the actuator magnets 109 is perpendicular to the disk 1 near the core 3a in a magnetic head (as directed upward) and a leaking field from the linear motor magnets 201 is parallel to the disk 1 near the core 3a in the magnetic head (as directed from right to left). Consequently, a composite field of the leaking fields from the actuator magnets 109 and from the linear motor magnets 201 is oblique from right bottom to left top, as shown in FIG. 7 (which shows an enlarged state near the core 3a). The point here is that the direction of the composite field is approximately parallel to a diagonal line A connecting between a bottom corner of opposed pole 3 sp of core 3a and a top corner located diagonal thereto in the core 3a. In such leaking fields, magnetization is induced inside the core 3a distributed as shown by signs – and + in FIG. 7 near the corner of opposed pole 3 sp and near the corner located diagonal thereto. This magnetization produces a magnetic field with lines of magnetic force as shown by the solid lines in FIG. 7, which are concentrated near the corner of opposed pole 3 sp and near the corner located diagonal thereto where the above magnetization is distributed. Further, the magnetization produces no magnetic field at the free end of main pole 3 mp where the magnetization distribution is rare. In this arrangement, even if the actuator magnets and the linear motor magnets produce the leaking fields perpendicular and parallel to the disk, there is no magnetic field acting as an offset in the portion irradiated by the light beam on the disk in recording an information signal, which enables excellent information recording accordingly.

Figure 8:
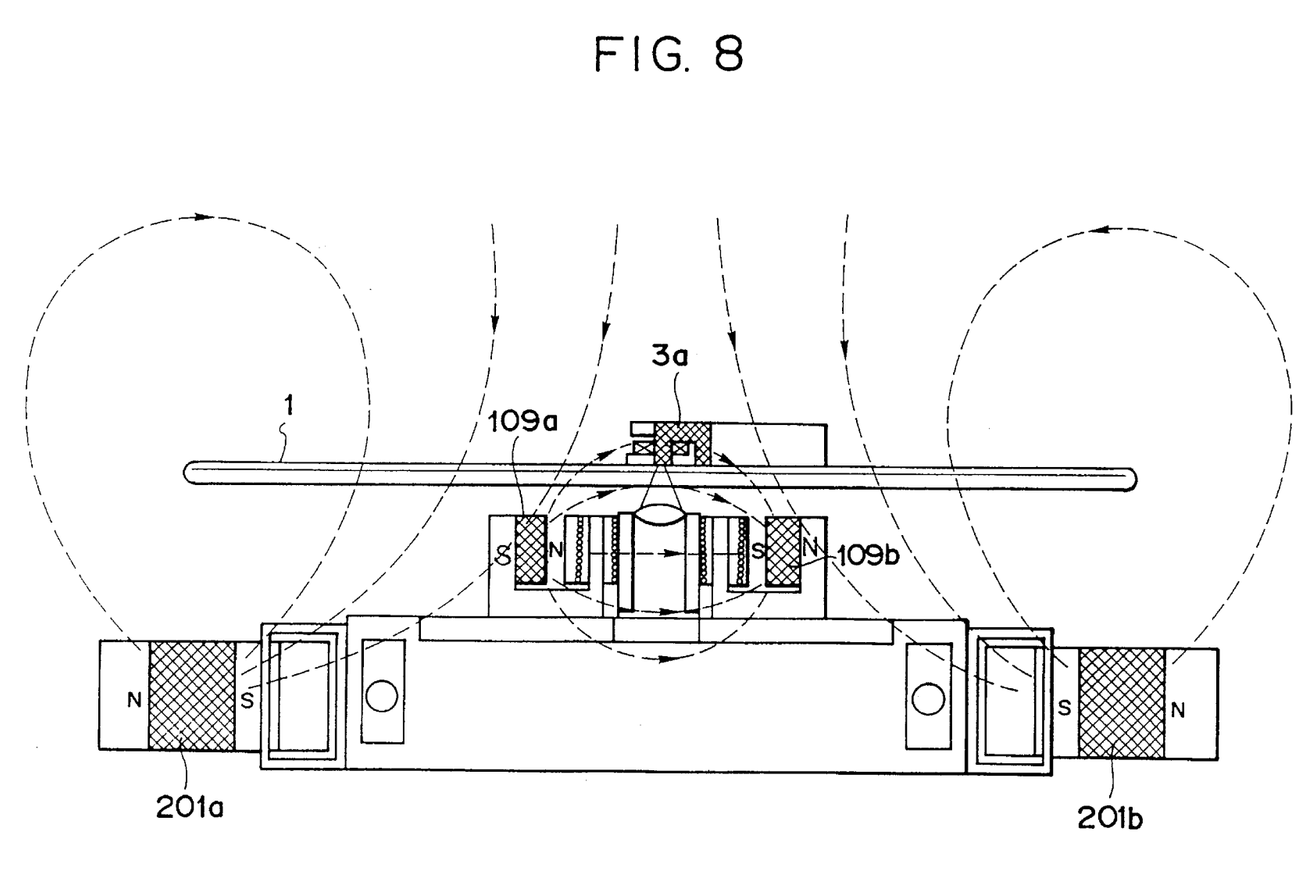
FIG. 8 is a drawing to show the scheme of leaking fields in a magneto-optical recording apparatus in another embodiment of the present invention.

Next described is another example of an arrangement of actuator magnets and linear motor magnets. FIG. 8 shows an example in which a pair of actuator magnets 109 are arranged to have mutually opposed faces as different magnetic poles (S-pole of right magnet 109b and N-pole of left magnet 109a opposed to each other in the present embodiment) and a pair of linear motor magnets are arranged to have mutually opposed faces as the same magnetic poles (S-poles opposed to each other in the present embodiment), in which broken lines represent approximate lines of magnetic force of leaking fields.

Figure 9:
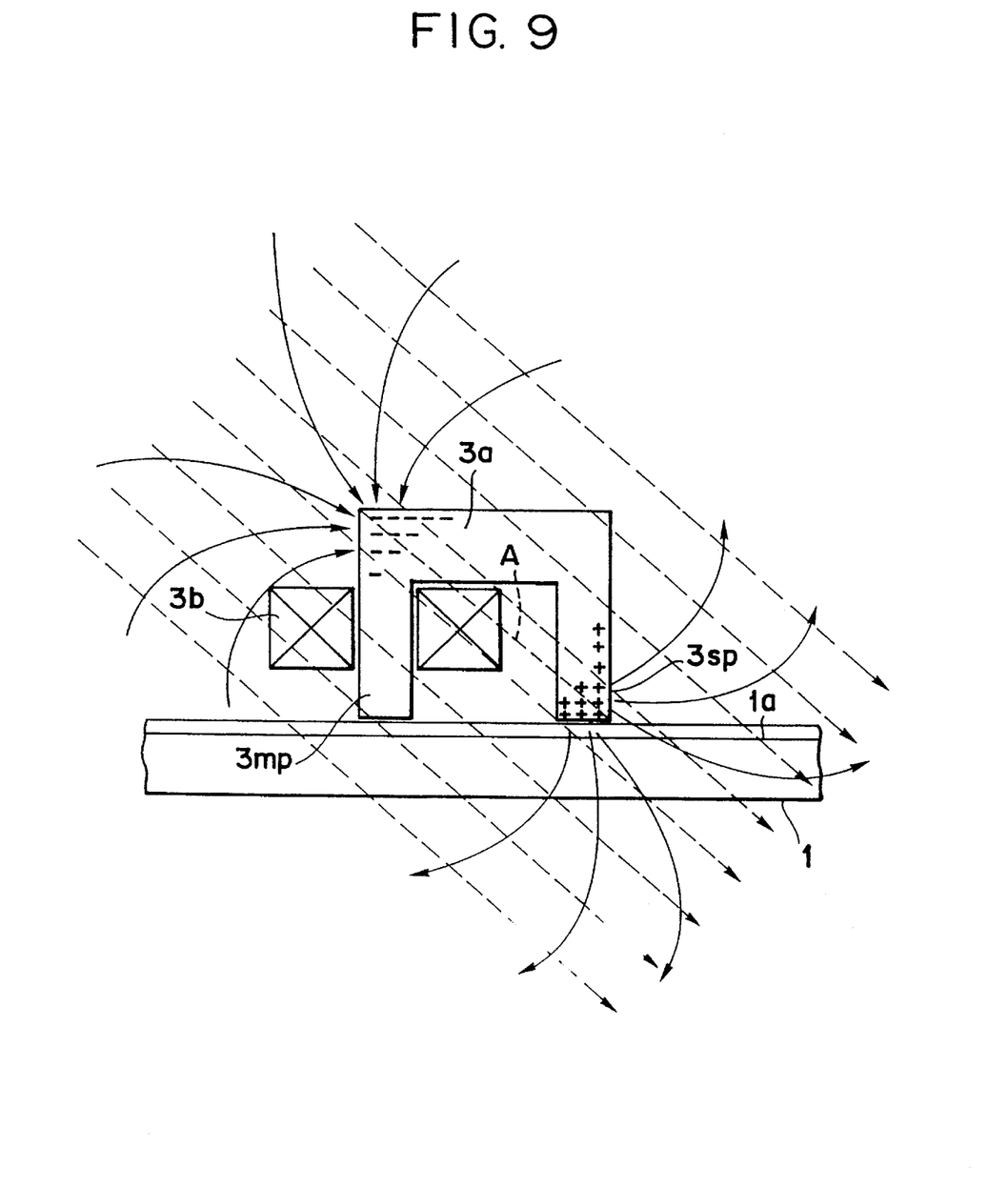
FIG. 9 is an enlarged drawing near the core in FIG. 8.

As shown in FIG. 8, a leaking field from actuator magnets 109 is parallel to the disk 1 near the core 3a in the magnetic head (as directed from left to right) and a leaking field from linear motor magnets 201 is perpendicular to the disk 1 near the core 3a in the magnetic head (as directed downward). Consequently, a composite field of the leaking fields from the actuator magnets 109 and from the linear motor magnets 201 is oblique from left top to right bottom as shown in FIG. 9 (which shows an enlarged state near the core). Also in this example, similarly as in the previous embodiment, the direction of the composite field is approximately parallel to a diagonal line A connecting between the bottom corner of opposed pole 3 sp of core 3a and the top corner located diagonal thereto. In such leaking fields, magnetization is induced inside the core 3a distributed as shown by signs+ and– in FIG. 9 near the bottom corner of opposed pole 3 sp and near the top corner located diagonal thereto. This magnetization produces a magnetic field having lines of magnetic force as shown by the solid lines in FIG. 9, which are concentrated near the corner of opposed pole 3 sp and near the corner located diagonal thereto where the above magnetization is distributed. There is no magnetic field produced at the free end of magnetic pole 3 mp where the magnetization distribution is rare. In this arrangement, even if the actuator magnets and the linear motor magnets produce the leaking fields parallel and perpendicular to the disk, there is no magnetic field acting an offset in the irradiated portion by the light beam on the disk in recording an information signal, thus enabling excellent information recording.

In the above embodiments, the important point is that the direction of a composite field of leaking fields from the actuator magnets and from the linear motor magnets is substantially parallel to the diagonal line connecting between the corner of opposed pole 3 sp and the corner located diagonal thereto in the vicinity of the core in magnetic head, but it is inessential whether the direction of the magnetic field is directed from left top to right bottom or from right bottom to left top.

Therefore, the embodiment shown in FIG. 6 may be modified such that the S-poles in the actuator magnet 109 are arranged to be opposed to each other, and the S-pole of the right magnet 201b in the linear motor magnet 201 is opposed to the N-pole of the left magnet 201a in the linear motor magnet 201.

Also, the embodiment shown in FIG. 8 may be modified such that the N-poles in the linear motor magnet 201 are mutually opposed and the N-pole of the right magnet 109b in the actuator magnet 109 is opposed to the S-pole of the left magnet 109a in the actuator magnet 109.

With respect to the effect, the optimum direction the composite field is not always parallel to the diagonal line connecting between the corner of an opposed pole and the corner located diagonal thereto. The optimum direction of the field is related to the shape of the core and should be considered to drop within the range of about ±30° with respect to the diagonal line. For example, when a ratio of height to width of the core is 1:1, the optimum direction of the composite field of leaking fields is about 20° closer to the disk than the diagonal line, approaching the direction parallel to the disk (whereby the incident angle of the magnetic field is about 25° to the disk). For reference, if the direction of the composite field of leaking fields were approximately parallel to the other diagonal line connecting between a corner of the main pole of the core and a corner located diagonal thereto, different from the arrangement in the present invention, magnetization would be induced at the distal end of the main pole where lines of magnetic force of the produced magnetic field are concentrated. Therefore, this arrangement should be avoided in designing.

It should be noted that the construction of the actuator and linear motor as described was shown as an example and that the arrangement of the present invention can be applicable to any of various conventional constructions of actuator and linear motor. Specifically, the invention can be applied to an example employing an actuator and a linear motor each having at least a pair of permanent magnets located on both sides of the magnetic head. This example has a great degree of freedom in designing. Further, the example permits the permanent magnets to be properly arranged in position, whereby such an arrangement can be easily achieved that one pair of permanent magnets produce a leaking field approximately parallel to the disk near the magnetic head while another pair of permanent magnets produce a leaking field approximately perpendicular to the disk near the magnetic head and that a composite field of the leaking fields produced by the two pairs of permanent magnets is approximately parallel to a diagonal line connecting a corner of an opposed pole of the core and a corner located diagonal thereto near the magnetic head.

Figure 10:
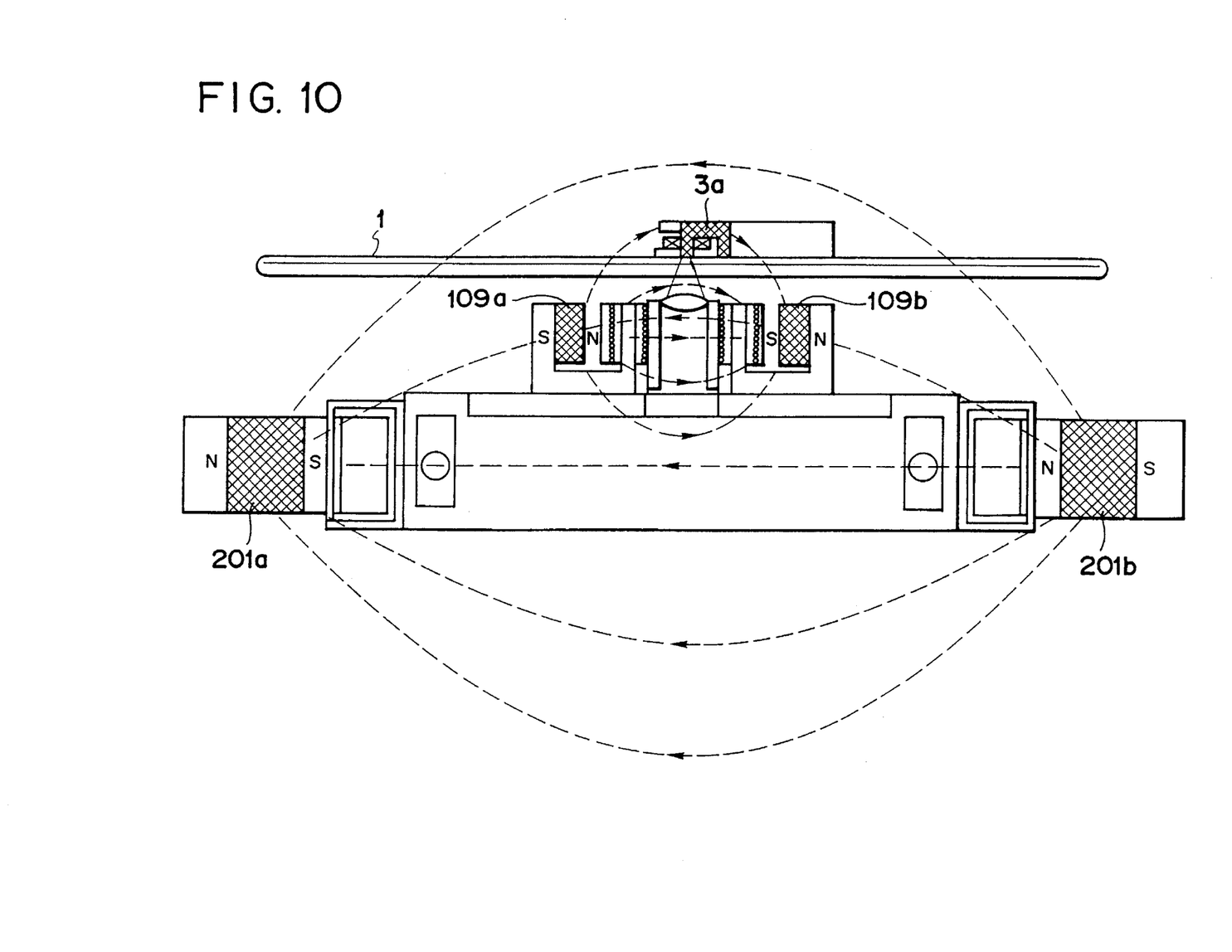
FIG. 10 is a drawing to show the scheme of leaking fields in a magneto-optical recording apparatus in another embodiment of the present invention.

Next described is still another construction for the magneto-optical recording apparatus according to the present invention. FIG. 10 shows an example in which a pair of actuator magnets 109 are arranged to have mutually opposed faces as different magnetic poles (S-pole of right magnet 109b and N-pole of left magnet 109a opposed to each other in the present embodiment) and a pair of linear motor magnets 201 also have mutually opposed faces as different magnetic poles which are reversed in pole location from that of the above actuator magnets 109 (i.e., N-pole of right magnet 201b and S-pole of left magnet 201a opposed to each other), in which broken lines represent approximate lines of magnetic force of leaking fields.

As shown in FIG. 10, a leaking field from the actuator magnets 109 is parallel to the disk 1 near the core 3a the magnetic head (as directed from left to right) and a leaking field from the linear motor magnets 201 is also parallel to the disk 1 near the core 3a the magnetic head but opposite in direction to the direction of leaking field from the actuator magnets 109 (thus the field from the linear motor magnets 201 is directed from right to left). Further, the leaking field from the actuator magnets 109 is arranged to have a strength approximately equal to that of the leaking field from the linear motor magnets 201 near the core 3a the magnetic head.

Figure 11:
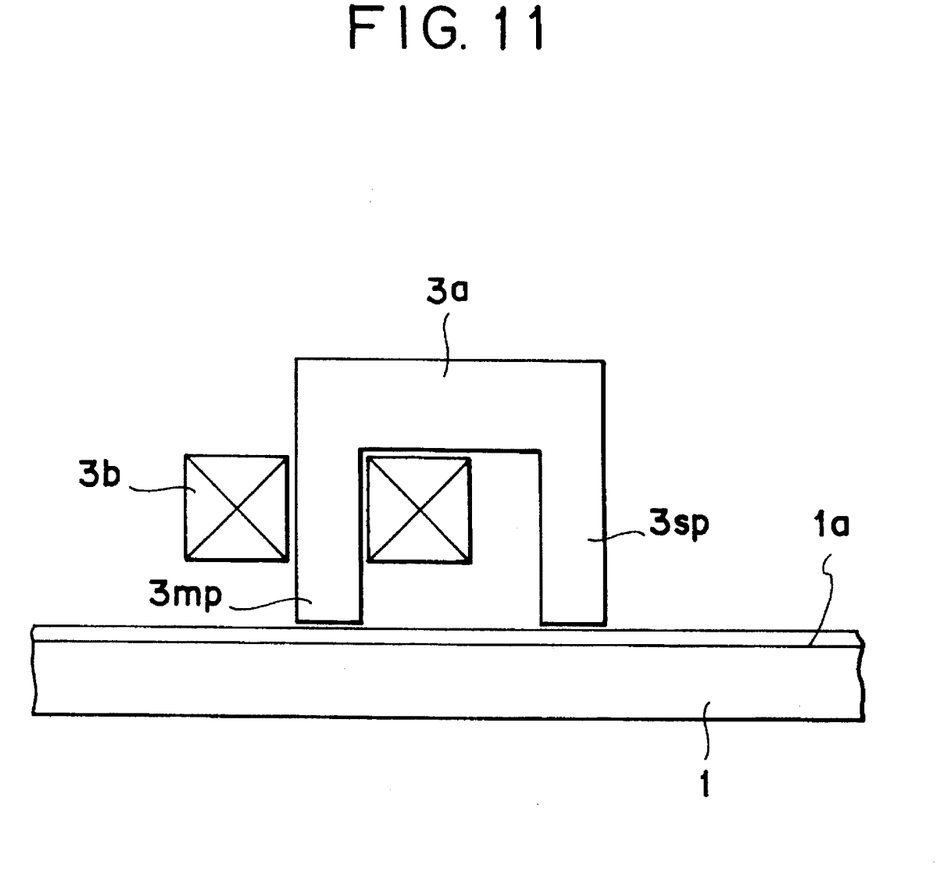
FIG. 11 is an enlarged drawing near the core in FIG. 10.

As a result, the leaking fields from the actuator magnets 109 and from the linear motor magnets 201 cancel each other so that no leaking field exists in the vicinity of the core 3a in the magnetic head, as shown in FIG. 11.

In this arrangement, no magnetization is induced inside the core 3a, so that there is no magnetic field acting as an offset in the portion irradiated by the light beam on the disk 1, thus enabling excellent information recording.

Although the present embodiment is so arranged that both the leaking fields from the actuator magnets and from the linear motor magnets are parallel to the disk near the core in the magnetic head and have no perpendicular components, another arrangement different from the arrangement in the present embodiment can be employed. For example, leaking fields from the actuator magnets and from the linear motor magnets may have both parallel components and perpendicular components to the disk near the core in the magnetic head. In that arrangement, the parallel components of leaking fields to the disk should be arranged to cancel each other as in the above embodiment and influence of the perpendicular components can be avoided by also using well-known means (for example by providing a magnet near the magnetic head to cancel the magnetic field).

Also, if a magneto-optical recording apparatus employs an almost U-shaped core as in the embodiments with the main pole and the opposed pole being aligned in the tangential direction relative to disk, components in the tangential direction relative to disk would be influential especially among the parallel components of leaking field to the disk. Accordingly, the present invention is more effective in particular for apparatus having a leaking field with tangential components to the disk among parallel components to the disk.

As described above, according to the present invention, a magneto-optical recording apparatus comprises an actuator for electromagnetically driving an objective lens for focusing a light beam to form a fine spot on a magneto-optical disk so as to effect focusing and tracking, a magnetic head for applying a magnetic field to a portion irradiated by the light beam on the magneto-optical disk, and a linear motor for electromagnetically driving the objective lens and the magnetic head in a united or synchronized manner to effect the seek operation in the radial direction of the magneto-optical disk, in which the magnetic head is provided with a substantially U-shaped core having a main pole facing the magneto-optical disk and an opposed pole opposed to the main pole and in which a direction of a leaking field produced by the actuator and the linear motor is substantially parallel near the magnetic head to a diagonal line connecting between a corner of the opposed pole of the core and a corner located diagonal thereto.

In another arrangement, the actuator magnets and the linear motor magnets are arranged such that the leaking fields from the actuator and from the linear motor are formed to cancel at least parallel components to the magneto-optical disk near the magnetic head.

Therefore, the leaking fields do not induce magnetization at the distal end of a main pole of the core, so that there is no magnetic field acting as an offset in the portion irradiated by the light beam on disk in recording the information signal, thus enabling excellent information recording.

In the embodiments as shown in FIG. 6 to FIG. 9, a requirement is that a composite field of the leaking field from the actuator magnets and the leaking field from the linear motor magnets is oblique in the vicinity of core 3a.

Therefore, depending upon the strength of each leaking field, a combination of two leaking fields could be different from the combination of the perpendicular leaking field and parallel leaking field.

Also, although the above embodiments employed the substantially U-shaped magnetic head, the present invention is of course applicable to apparatus employing a ring head with a gap provided in a portion of the magnetic path.

What is claimed is:

1. A magneto-optical recording apparatus comprising:
   an actuator for driving an objective lens for focusing a light beam on a magneto-optical disk to effect focusing and tracking;
   a magnetic head for applying a magnetic field to a portion irradiated by the light beam on the magneto-optical disk, said magnetic head having a substantially U-shaped core with a main pole facing the magneto-optical disk and a pole opposed thereto, a magnetic field modulated in accordance with an information signal being applied from said main pole; and
   a linear motor for performing a seek operation to move said objective lens and magnetic head in a radial direction with respect to the magneto-optical disk,
   wherein a direction of a composite field of leaking fields from said actuator and from said linear motor is substantially parallel to a diagonal line connecting between a first corner of the opposed pole of said core near the magneto-optical disk and a second corner located diagonal to the first corner in the vicinity of said magnetic head.

2. A magneto-optical recording apparatus according to claim 1, wherein each of said actuator and linear motor has a pair of permanent magnets and wherein said permanent magnets are arranged such that a leaking field caused by one pair of permanent magnets is substantially parallel to a surface of the magneto-optical disk near said magnetic head and that a leaking field caused by the other pair of permanent magnets is substantially perpendicular to the surface of the magneto-optical disk near said magnetic head.

3. A magneto-optical recording apparatus comprising:
   an objective lens for irradiating a magneto-optical disk with a light beam and for focusing the light beam on the magneto-optical disk;
   a magnetic head for applying a magnetic field to a portion irradiated by the light beam on the magneto-optical disk, said magnetic head having a core with a main pole facing the magneto-optical disk and a pole opposed to said main pole, the shape of said core being asymmetrical with respect to said main pole and a magnetic filed modulated in accordance with an information signal being applied from said main pole;
   an actuator for driving said objective lens to effect focusing and tracking, said actuator having a pair of permanent magnets located on either side of said magnetic head; and
   a linear motor for performing a seek operation to move said objective lens and magnetic head in one of a united and a synchronized manner in a radial direction with respect to the magneto-optical disk, said linear motor having a pair of permanent magnets located on either side of said magnetic head,
   wherein said permanent magnets in said actuator and in said motor are arranged such that a leaking magnetic field caused by said permanent magnets induces no magnetization in a portion of said main pole near the magneto-optical disk.

4. A magneto-optical recording apparatus according to claim 3, wherein said magnetic head is a ring head with a gap provided in a portion of a magnetic path.

5. A magneto-optical recording apparatus according to claim 3, wherein the pair of permanent magnets in said actuator have N-poles opposed to each other and the pair of magnets in said linear motor have an N-pole and S-pole opposed to each other and wherein the N-pole of said linear motor is located closer to said opposed pole than to said main pole.

6. A magneto-optical recording apparatus according to claim 3, wherein the pair of permanent magnets in said actuator have an N-pole and S-pole opposed to each other and the pair of magnets in said linear motor have S-poles opposed to each other and wherein the S-pole of said actuator is located closer to said opposed pole than to said main pole.

7. A magneto-optical recording apparatus according to claim 3, wherein the pair of permanent magnets in said actuator have an N-pole and S-pole opposed to each other and the pair of magnets in said linear motor have an S-pole and N-pole opposed to each other, and the N-pole of said actuator and the S-pole of said linear motor are positioned on the same side.

8. A magneto-optical recording apparatus according to claim 3, wherein the pair of permanent magnets in said actuator have S-poles opposed to each other and the pair of magnets in said linear motor have an N-pole and S-pole opposed to each other and wherein said S-pole of said linear motor is located closer to said opposed pole than to said main pole.

9. A magneto-optical recording apparatus according to claim 3, wherein the pair of permanent magnets in said actuator have an N-pole and S-pole opposed to each other and the pair of magnets in said linear motor have N-poles opposed to each other and wherein the N-pole of said actuator is located closer to said opposed pole than to said main pole.

10. A magneto-optical recording apparatus comprising:

an actuator for driving an objective lens for focusing a light beam on a magneto-optical disk to effect focusing and tracking;

a magnetic head for applying a magnetic field to a portion irradiated by the light beam on the magneto-optical disk, said magnetic head having a substantially U-shaped core with a main pole facing the magneto-optical disk and a pole opposed thereto, a magnetic field modulated in accordance with an-information signal being applied from said main pole; and a linear motor for performing a seek operation to move said objective lens and magnetic head in a radial direction with respect to the magneto optical disk, wherein a direction of a composite field of leaking fields from said actuator and from said linear motor is substantially parallel to a diagonal line connecting between a first corner of the opposed pole of said core near the magneto-optical disk and a second corner located diagonal to the first corner in the vicinity of said magnetic head, so that magnetization is induced in a portion near the first corner and a portion near the second corner and no magnetization is induced in a third corner of said main pole located near the magneto-optical disk.

11. A magneto-optical recording apparatus according to claim 10, wherein each of said actuator and linear motor comprises a pair of permanent magnets and said permanent magnets are arranged such that a leaking field caused by one pair of permanent magnets is substantially parallel to a surface of the magneto-optical disk near said magnetic head and that a leaking field caused by the other pair of permanent magnets is substantially perpendicular to the surface of the magneto-optical disk near said magnetic head.

12. A magneto-optical recording apparatus comprising:

an objective lens for irradiating a magneto-optical disk with a light beam and for focusing the light beam on the magneto-optical disk;

a magnetic head for applying a magnetic field to a portion irradiated by the light beam on the magneto-optical disk, said magnetic head having a core with a main pole facing the magneto-optical disk and a pole opposed to said main pole, the shape of said core being asymmetrical with respect to said main pole, and a magnetic field modulated in accordance with an information signal being applied from said main pole;

located near actuator for driving said objective lens to effect focusing and tracking, said actuator having a pair of permanent magnets located on either side of said magnetic head; and a linear motor for performing a seek operation to move said objective lens and magnetic head in one of a united and a synchronized manner in a radial direction with respect to the magneto-optical disk, said linear motor having a pair of permanent magnets located on either side of said magnetic head, wherein a direction of leaking magnetic fields caused by said permanent magnets in said actuator and said linear motor is substantially parallel to a diagonal line connecting between a first corner of said opposed magnetic pole near the magneto-optical disk and a second corner located diagonal to the first corner, and the leaking magnetic fields induce no magnetization in a third corner of said main pole located near the magneto-optical disk.

13. A magneto-optical recording apparatus according to claim 12, wherein said magnetic head is a ring head with a gap provided in a portion of a magnetic path.

14. A magneto-optical recording apparatus according to claim 12, wherein the pair of permanent magnets in said actuator have N-poles opposed to each other and the pair of magnets in said linear motor have an N-pole and S-pole opposed to each other and wherein the N-pole of said linear motor is located closer to said opposed poles than to said main pole.

15. A magneto-optical recording apparatus according to claim 12, wherein the pair of permanent magnets in said actuator have an N-pole and S-pole opposed to each other and the pair of magnets in said linear motor have S-poles opposed to each other and wherein the S-pole of said actuator is located closer to said opposed pole than to said main pole.

16. A magneto-optical recording apparatus according to claim 12, wherein the pair of permanent magnets in said actuator-have an N-pole and S-pole opposed to each other and the pair of magnets in said linear motor have an S-pole and N-pole opposed to each other, and the N-pole of said actuator and the S-pole of said linear motor are positioned on the same side.

17. A magneto-optical recording apparatus according to claim 12, wherein the pair of permanent magnets in said actuator have S-poles opposed to each other and the pair of magnets in said linear motor have an N-pole and S-pole opposed to each other and wherein the S-pole of-said linear motor is located closer to said opposed pole than to said main pole.

18. A magneto-optical recording apparatus according to claim 12, wherein the pair of permanent magnets in said actuator have an N-pole and S-pole opposed to each other and the pair of magnets in said linear motor have N-poles opposed to each other and wherein the N-pole of said actuator is located closer to said opposed pole than to said main pole.

* * * * *

UNITED STATES PATENT AND TRADEMARK OFFICE
CERTIFICATE OF CORRECTION

PATENT NO. : 5,563,853
DATED : October 8, 1996
INVENTOR(S) : KAZUYOSHI ISHII

It is certified that error appears in the above-indentified patent and that said Letters Patent is hereby corrected as shown below:

COLUMN 1

Line 31, "discussed" should read --be discussed in--.

COLUMN 2

Line 9, "Then" should read --Then,--.
    Line 33, "inventors" should read --inventor--.

COLUMN 5

Line 21, "signs" should read --signs +--.
    Line 22, "and-in" should read --and - in--.
    Line 33, "acting" should read --acting as--.
    Line 58, "direction" should read --direction of--.
    Line 63, "drop" should read --fall--.

COLUMN 6

Line 45, "core 3a" should read --core 3a in--.
    Line 48, "core 3a" should read --core 3a in--.
    Line 49, "leaking" should read --the leaking--.

COLUMN 7

Line 58, "employed" should read --employ--.

UNITED STATES PATENT AND TRADEMARK OFFICE
CERTIFICATE OF CORRECTION

PATENT NO. : 5,563,853
DATED : October 8, 1996
INVENTOR(S) : KAZUYOSHI ISHII

It is certified that error appears in the above-identified patent and that said Letters Patent is hereby corrected as shown below:

COLUMN 8

Line 36, "filed" should read --field--.

COLUMN 9

Line 16, "said" (first occurrence) should read --the--.
    Line 35, "an-information" should read --an information--.
    Line 39, "magneto optical" should read --magneto-optical--.

COLUMN 10

Line 7, "located near" should read --an--.
    Line 35, "poles" should read --pole--.

Signed and Sealed this

Seventeenth Day of February, 1998

Attest:

BRUCE LEHMAN

Attesting Officer      Commissioner of Patents and Trademarks